US008189912B2

(12) United States Patent
Piper

(10) Patent No.: US 8,189,912 B2
(45) Date of Patent: May 29, 2012

(54) EFFICIENT HISTOGRAM STORAGE

(75) Inventor: Scott A. Piper, Bothell, WA (US)

(73) Assignee: International Business Machines Corporation, Armonk, NY (US)

( * ) Notice: Subject to any disclaimer, the term of this patent is extended or adjusted under 35 U.S.C. 154(b) by 1221 days.

(21) Appl. No.: 11/944,613

(22) Filed: Nov. 24, 2007

(65) Prior Publication Data

US 2009/0136130 A1 May 28, 2009

(51) Int. Cl.
G06K 9/00 (2006.01)
(52) U.S. Cl. ........ 382/168; 382/170; 382/190; 348/722; 348/700; 348/701
(58) Field of Classification Search .................. 382/170, 382/190, 168, 169, 172, 305, 128, 301, 261, 382/271, 272, 13; 348/722, 700, 701, 907, 348/465, 473, 553, 460, 552; 702/60, 61, 702/181, 182, 18
See application file for complete search history.

(56) References Cited

U.S. PATENT DOCUMENTS

| 5,216,623 | A | * | 6/1993 | Barrett et al. | 702/62 |
| 5,689,696 | A |   | 11/1997 | Gibbons et al. | |
| 5,870,752 | A | * | 2/1999 | Gibbons et al. | 1/1 |
| 6,181,817 | B1 | * | 1/2001 | Zabih et al. | 382/170 |
| 7,170,566 | B2 | * | 1/2007 | McGee et al. | 348/722 |
| 7,260,487 | B2 | * | 8/2007 | Brey et al. | 702/60 |
| 7,317,835 | B2 | * | 1/2008 | Kanatsu et al. | 382/190 |
| 7,889,923 | B1 | * | 2/2011 | Carr et al. | 382/168 |
| 2002/0049759 | A1 | * | 4/2002 | Christensen | 707/10 |
| 2006/0085399 | A1 | * | 4/2006 | Carmel et al. | 707/3 |

OTHER PUBLICATIONS

Shmuel T. Klein, Miri Kopel Ben-Nissan, "On the Usefulness of Fibonacci Compression Codes"; The Computer Journal vol. 00 No. 0, 2005, pp. 1-15.*
M Murallknshna, Equt-Depth Histograms for Estimatmg Selectivity Factors for Multi-Dtmenstonal Querie1988 ACM, pp. 28-36.*
Shmuel T. Klein, Miri Kopel Ben-Nissan, "On the Usefulness of Fibonacci Compression Codes"; The Computer Journal vol. O0 No. 0, 2005, pp. 1-15.*

* cited by examiner

Primary Examiner — Brian Q Le
Assistant Examiner — Mekonen Bekele
(74) Attorney, Agent, or Firm — Thomas Tyson

(57) ABSTRACT

A histogram has ranges, a value for each range, and a time value. A pattern is generated, having a zero value for each range having a zero value, and a one value for each range having a non-zero value. Any non-zero values of the ranges are compressed into a compressed value. The pattern and the time value match or do not match any given entry of a pattern table having a number of entries, each of which has an index value, a time range, and a pattern. Where the pattern and the time value do not match any given entry of the pattern table, a new entry is added to the pattern table, and is considered the given entry. An entry is then added to a histogram table. This entry has the time value, the index value of the given entry of the pattern table, and the compressed value.

16 Claims, 6 Drawing Sheets

FIG 3

| | INDEX 304 | START TIME 306 | END TIME 308 | PATTERN 312 |
|---|---|---|---|---|
| 302A → | 0 | $t_0$ | $t_b$ | (PATTERN) |
| 302B → | 1 | $t_1$ | $t_c$ | (PATTERN) |
| 302C → | 2 | $t_2$ | <NONE> | (PATTERN) |
| | . . . | . . . | . . . | . . . |
| 302L → | 255 | $t_a$ | <NONE> | (PATTERN) |
| 302M → | 0 | $t_b$ | <NONE> | (PATTERN) |
| 302N → | 1 | $t_c$ | <NONE> | (PATTERN) |

Columns 306 and 308 are bracketed as 310.

FIG 4

| | INDEX 404 | TIME 406 | COMPRESSED VALUE 408 |
|---|---|---|---|
| 402A → | (INDEX) | $t_0$ | (COMPRESSED VALUE) |
| 402B → | (INDEX) | $t_1$ | (COMPRESSED VALUE) |
| 402C → | (INDEX) | $t_2$ | (COMPRESSED VALUE) |
| | . . . | . . . | . . . |
| 402N → | (INDEX) | $t_n$ | (COMPRESSED VALUE) |

EFFICIENT HISTOGRAM STORAGE

FIELD OF THE INVENTION

The present invention relates generally to histograms, and more particularly to efficiently storing histograms.

FIELD OF THE INVENTION

A histogram is a data structure by which data can be organized. In particular, a histogram has a value for each of a number of non-overlapping ranges, or intervals. The value for each range indicates the number of data points that occurred within the range in question. A sparse histogram may be considered a histogram where the values for the vast majority of ranges are equal to zero, corresponding to zero data points having occurred within these ranges.

Histograms are particularly useful when assessing power utilization or consumption of a computing device like a server. The ranges or intervals of a histogram in this example may correspond to different power ranges, such as 0 to 10 watts, 11 to 20 watts, and so on. A histogram is generated for each of a number of given time periods. Within each time period, the power consumption of the computing device is sampled a number of times, and the value for the corresponding power range incremented by one. Each histogram thus stores the sampled power consumption data for a different time period. Each time period may have a unique time value, such as the start or end time of the time period.

One problem with histograms is that when there are a large number of them, the storage capacity required to store the histograms can become intractably large. For instance, where the histograms store the sampled power consumption data for different time periods of a large number of computing devices, the storage capacity required to store these histograms may become intractably large. As a result, there is a need to efficiently store these and other types of histograms.

SUMMARY OF THE INVENTION

The present invention relates generally to efficiently storing histograms. A method of one embodiment of the invention receives a histogram that has a number of ranges, a value for each range, and a time value corresponding to the time period of the data represented by the histogram. The method generates a pattern of the histogram. The pattern has a zero value for each range having a zero value, and a one value for each range having a non-zero value.

The method determines whether the pattern of the histogram and the time value of the histogram match any given entry of a pattern table. The pattern table has a number of entries, each of which has an index value, a time range, and a pattern. Where the pattern of the histogram and the time value of the histogram do not match a given entry of the pattern table, the method adds a new entry to the pattern table. The time range of the new entry has a start time equal to the time value of the histogram, and the pattern of the new entry is set to the pattern of the histogram. The new entry thus becomes the given entry that the pattern of the histogram and the time value of the histogram match.

The method compresses any non-zero values of the ranges of the histogram into a compressed value. The method concludes by adding an entry for the histogram to a histogram table. This entry has the time value of the histogram, the index value of the given entry of the pattern table, and the compressed value of any non-zero values of the ranges of the histogram.

A computer-readable medium of another embodiment of the invention stores one or more computer programs that upon execution perform a method to retrieve a histogram that has been previously stored. The computer-readable medium may be a recordable data storage medium, for instance, or another type of tangible computer-readable medium. The method receives at least a time value of the histogram. The method looks up the time value within the histogram table to locate an entry within the histogram table corresponding to the time value. This entry has the time value, an index value corresponding to an entry within the pattern table, and a compressed value of any non-zero values of a plurality of ranges of the histogram.

The method then looks up the index value and the time value within the pattern table to locate an entry within the pattern table corresponding to the index value and the time value. This entry within the pattern table has the index value, a time range encompassing the time value, and a pattern. The pattern has a zero value for each range of the histogram having a zero value, and a one value for each range of the histogram having a non-zero value. The method generates the histogram based on the pattern retrieved from the pattern table and based on the compressed value retrieved from the histogram table.

A computerized system of an embodiment of the invention includes one or more storage devices that store one or more databases within which a pattern database table and a histogram database table are stored. The pattern database table has a number of entries, each of which has an index value, a time range, and a pattern. The histogram database table also has a number of entries, each of which corresponds to a histogram. More specifically, each entry of the histogram database table has a time value corresponding to the time range of an entry within the pattern database table, an index value corresponding to the index value of an entry within the pattern database table, and a compressed value of any non-zero values of the ranges of the histogram to which the entry corresponds.

The computerized system includes a mechanism, which may be implemented in software, hardware, or a combination of software and hardware. The mechanism is to update the pattern database table and the histogram database table upon receiving new histograms to be stored within the databases, such as by performing the method that has been described above. The mechanism is also to retrieve existing histograms stored within the databases by querying the pattern database table and the histogram database table upon receiving time values corresponding to the existing histograms, such as by performing the method that has been described above.

Embodiments of the invention provide for advantages over the prior art. In particular, embodiments realize an efficient way to store a large number of histograms. It is noted, for instance, that the total number of entries in the pattern table may exceed the total number of different index values. This is made possible due to both the time value and the index value serving as an index into the pattern table. As such, the number of bytes allocated to storing the index value does not have to be increased to accommodate a large number of patterns being stored in the pattern table, permitting more efficient storage of histograms.

Still other aspects, embodiments, and advantages of the present invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustra

FIG. 3 is a diagram of a representative pattern table, according to an embodiment of the invention.

FIG. 4 is a diagram of a representative histogram table, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
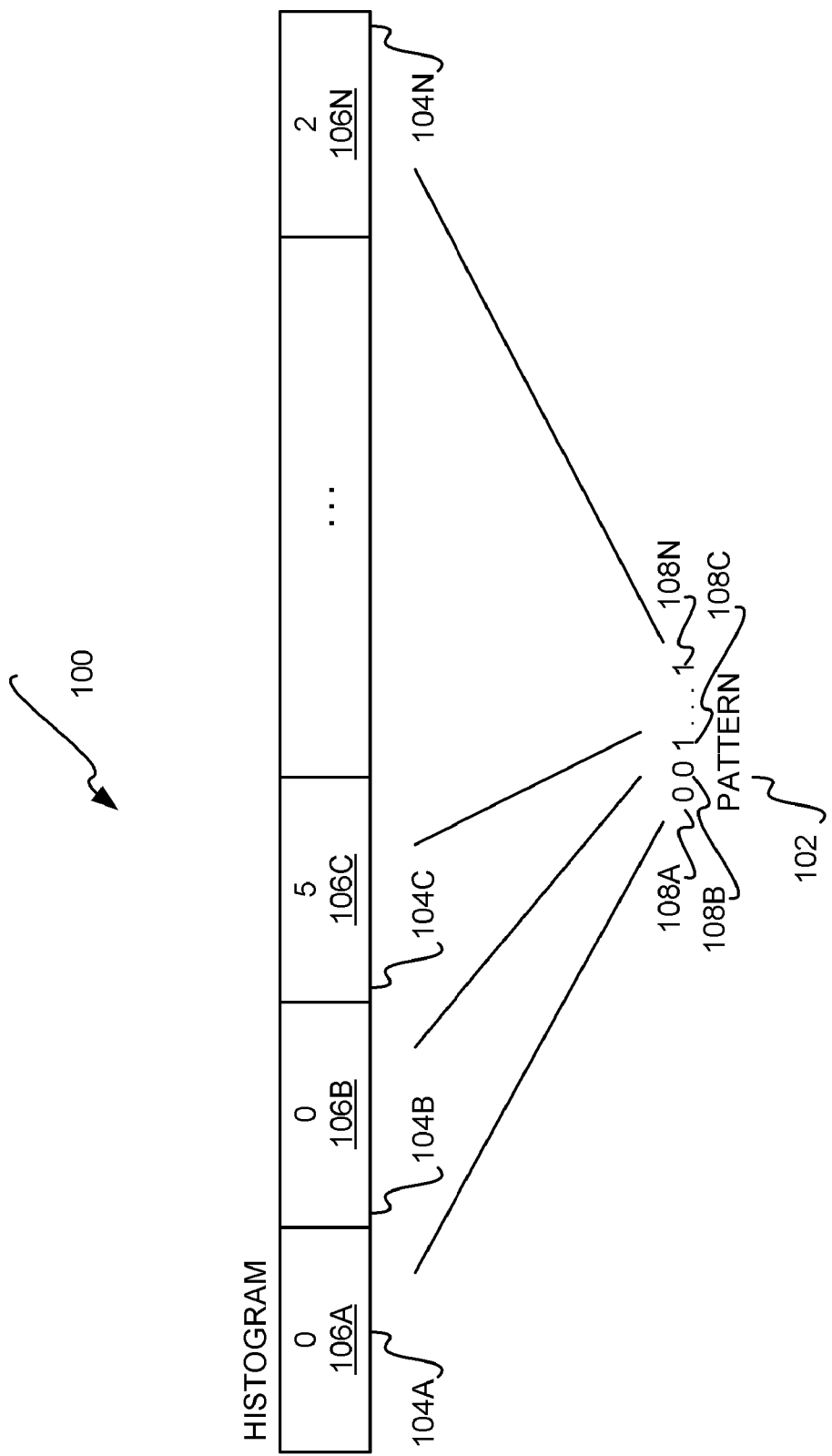
- FIG. 1 is a diagram of a representative histogram and its corresponding pattern, according to an embodiment of the invention.

FIG. 1 shows a representative histogram 100 and its corresponding pattern 102, according to an embodiment of the invention. The histogram 100 has a number of ranges 104A, 104B, 104C, . . . , 104N, collectively referred to as the ranges 104. The ranges 104 are non-overlapping intervals. The histogram 100 further has a number of values 106A, 106B, 106C, . . . , 106N, collectively referred to as the values 106, for the ranges 104. The value for each range indicates the number of data points that occurred within the range in question.

For example, when assessing power utilization or consumption of a computing device like a server, the ranges 104 may correspond to different power ranges, such as 0 to 10 watts, 11 to 20 watts, 21 to 30 watts, and so on. During a given time period in relation to which the histogram corresponds, the power utilization of the computing device may be sampled a number of times, yielding a number of power consumption values. For each power consumption value, the value for the range encompassing the power consumption value is incremented. For example, if the sampled power consumption values are 5, 25, 26, 29, and 30, then the value for the range of the histogram corresponding to the power range 0-10 watts is incremented once, and the value for the range of the histogram corresponding to the power range 21-30 watts in incremented four times.

In this example, it thus can be said that the histogram corresponds to a particular computing device, where the ranges of the histogram correspond to utilized power ranges of the computing device. The value of the histogram for each range corresponds to the number of times the computing device was sampled during a specific time period as utilizing an amount of power within the utilized power range in question. The histogram also has a time value that corresponds to the specific time period within which the power consumption of the computing device was sampled. The time value may be the starting time of this time period, or the ending time of this time period, for instance.

In the example of FIG. 1, the value 106A for the range 104A of the histogram 100 is zero, and the value 106B for the range 104B is zero. This means that zero data points occurred within the ranges 104A and 104B during the time period to which the histogram 100 pertains. Similarly, the value 106C for the range 104C of the histogram 100 is five, and the value 106N for the range 104N is two. This means that five data points occurred within the range 104C and two data points occurred within the range 104N during the time period to which the histogram 100 pertains.

The storage requirements for the histogram 100 are equal to the number of ranges 104 times the amount of storage needed to storage the maximum value that any of the values 106 can take on. For example, if the values 106 can each be in the range of 0 to 255, this means that one byte (i.e., eight bits) is needed to store each of the values 106. However, it is noted that frequently the histogram 100 is sparse, meaning that the values 106 for the vast majority of the ranges 104 are equal to zero, corresponding to zero data points having occurred within the ranges 104. As such, storing the histogram 100 in such an (uncompressed) way is inefficient.

FIG. 1 also shows the pattern 102 that corresponds to the representative histogram 100. The pattern 102 has a number of values 108A, 108B, 108C, . . . 108N, correspond to the values 106 and the ranges 104 of the histogram 100 itself. In general, the pattern 102 has a zero value for each range of the histogram 100 that has a zero value, and the pattern 102 has a one value for each range of the histogram 100 that has a non-zero value (i.e., a value greater than zero). In particular, the values 108 of the pattern 102 are single bits. Thus, in this embodiment, it can be said that the pattern 102 has a zero bit for each range of the histogram 100 that has a zero value, and the pattern 102 has a one bit for each range of the histogram 100 that has a non-zero value.

Therefore, in the example of FIG. 1, the value 108A of the pattern 102 is zero, because the value 106A for the range 104A of the histogram 100 is zero. Likewise, the value 108B of the pattern 102 is zero. The value 108C of the pattern 102 is one, because the value 106C for the range 104C of the histogram 100 is non-zero (and is specifically five). Likewise, the value 108N of the pattern 102 is one.

In this way, the pattern 102 represents which of the values 106 of the ranges 104 of the histogram 100 are zero and which are non-zero in a compressed manner. Whereas the histogram 100 may need the number of the ranges 104 times eight bits for storage thereof (where each of the values 106 can be between 0 and 255), the pattern 102 needs just the number of the range 104 times one bit for storage thereof. In general, the pattern 102 needs just 1/M the storage that the histogram 100 does, where M is the number of bits needed to store each of the values 106.

It is noted that the pattern 102 is a lossy compression of the histogram 100, in that the actual values 106 of the histogram 100 are not able to be retrieved or regenerated from the pattern 102. However, embodiments of the invention relate to a lossless compression of the histogram 100, where the values 106 are stored outside of the pattern 102. It is noted that a zero value of the pattern 102 necessarily corresponds to a zero value for the associated range within the histogram 100. By comparison, a one value of the pattern 102 corresponds to a non-zero value for the associated range within the histogram 100; however, what this non-zero value is not stored within the pattern 102.

Therefore, in one embodiment, the non-zero values of the histogram 100 are compressed into a single value, which is particularly efficient where there is a small number of non-zero values within the histogram 100 (i.e., where the histogram 100 is sparse). Different such encoding approaches can be employed, including Fibonacci encoding, shifted Fibonacci encoding, and/or Elias encoding, as can be appreciated by one of ordinary skill within the art. In one embodiment, each positive integer is encoded as a unique sequence of bits, in which the last bit is one, and no consecutive bits are both one. By adding a final one bit to each such sequence of bits, a string of bits representing the non-zero values of the histogram 100 can be yielded where consecutive one bits demarcate encodings of non-zero values within the histogram 100.

For example, the value five may be encoded as 0001, and the value two may be encoded as 01. Thus, to encode the non-zero values five and two in the example histogram 100 of FIG. 1, a compressed bit string (i.e., a compressed value) of 00011011 is provided. When reconstructing the histogram 100 from the pattern 102, each time a one bit is encountered within the pattern 102, the next encoded non-zero value from the compressed bit string is retrieved. Thus, when the one bit of the value 108C is encountered within the pattern 102, the bits 00011 are retrieved from the bit string 00011011, where it is known that the final one bit within 00011 indicates the end of the encoding of a given non-zero value. Furthermore, because the bits 0001 are known to correspond to the value five (where the final one bit is discarded as a demarcation bit), the non-zero value of five is retrieved for the range 104C.

Similarly, when the one bit of the value 108N is encountered within the pattern 102, the bits 011 are retrieved from the bit string 00011011, where it is known that the final one bit within 011 indicates the end of the encoding of a given non-zero value. Because the bits 01 are known to correspond to the value two (where the final one bit is again discarded as a demarcation bit), the non-zero value of two is retrieved for the range 104N of the histogram 100. In this way, while the pattern 102 compresses the histogram 100 in a lossy manner, the overall compression of the histogram 100 is lossless, in that the compressed value retains—in a compressed manner—the specific non-zero values fore the ranges 106 of the histogram 100. Where the histogram 100 is sparse, there will be relatively few non-zero values, adding to the degree of compression achieved.

What follows next is a description of how this general compression scheme for a histogram can be employed to store a number of histograms in an efficient manner. A method is first described that adds entries to a pattern table and a histogram table, where the pattern table stores patterns like the pattern 102, and the histogram table stores indices into the pattern table for specific histograms and compressed values representing the non-zero values of these histograms. Thereafter a method is described by which the pattern table and the histogram table are used to reconstruct a histogram that corresponds to a given time period (i.e., that corresponds to a given time value associated with the time period).

Figure 2:
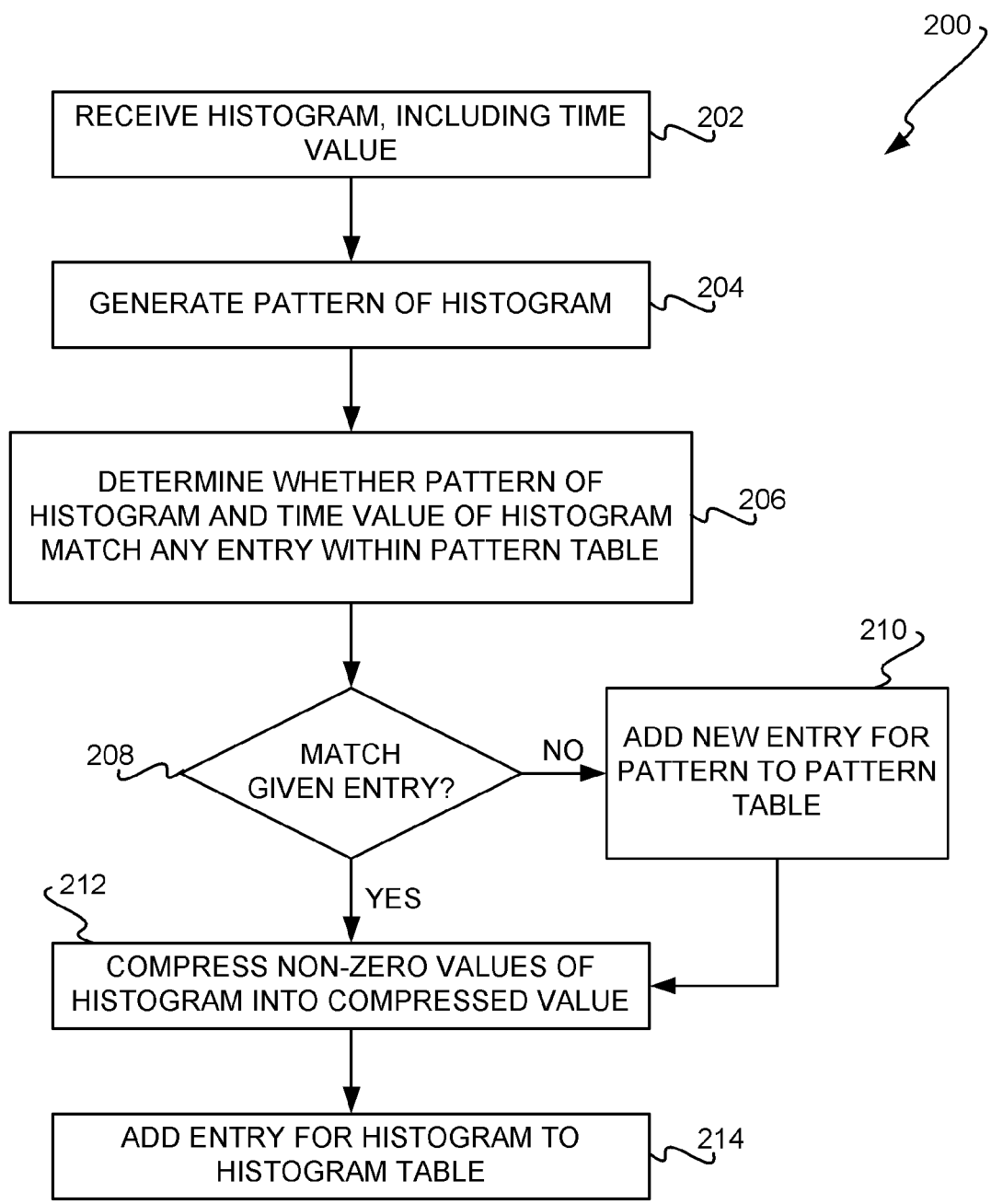
FIG. 2 is a flowchart of a method for maintaining a pattern table and a histogram table when adding a new histogram, according to an embodiment of the invention.

FIG. 2 shows a method 200 for adding an entry into a histogram table for a histogram, according to an embodiment of the invention. The method 200 may be implemented as one or more computer programs that are stored on a tangible computer-readable medium, such as a recordable data storage medium, and that are executed by a computing device. The method 200 receives a histogram (202), including a time value correspond to the time period in which data points have been recorded within the histogram. The histogram has a number of ranges and a value for each range, as has been described above in relation to FIG. 1.

A pattern of the histogram is then generated (204). In particular, the pattern has a zero value, such as a zero bit, for each range of the histogram that has a zero value, and the pattern has a one value, such as a one bit, for each range of the histogram that has a non-zero value. For instance, in relation to the histogram 100 of FIG. 1, the pattern 102 of FIG. 1 may be generated by proceeding through the values 106 in order from the first value 106A to the last value 106N. For each value that is zero, a corresponding zero value is generated within the pattern 102. For each value that is non-zero, a corresponding one value is generated within the pattern 102.

The method 200 determines whether the pattern that has been generated, and the time value of the histogram, match any entry within a pattern table (206). The pattern table has a number of entries. Each entry has an index value, a time range, and a pattern. The time range of an entry may include a start time and an end time, where the end time may not be present.

FIG. 3 shows a representative pattern table 300, according to an embodiment of the invention. The pattern table 300 includes a number of entries 302A, 302B, 302C, . . . , 302L, 302M, and 302N, collectively referred to as the entries 302. Each of the entries 302 has an index value 304, a time range 310 denoted by a start time 306 and an end time 308, and a pattern 312. The index value 304 may be a one-byte value that can thus range from 0 to 255. Each time a new entry is added to the pattern table 300, the index value 304 for the new entry is incremented by one, and rolls over to a minimum value (e.g., zero) when the maximum value (e.g., 255) is reached.

Furthermore, each time a new entry is added to the pattern table 300, the pattern 312 is set equal to the pattern of the histogram in question that has not been found in the pattern table 300. The start time 306 is set equal to the time value at which the histogram in question was generated, and which corresponds to the time period in which the histogram recorded data points. The end time 308 initially remains effectively unset, which is indicated as "<NONE>" in FIG. 3. In one embodiment, this may be achieved by setting the end time 308 to an initial value of "Jan. 1, 1970 0:00:00," as can be appreciated by those of ordinary skill within the art, as a placeholder value.

Upon first glance, it may be believed that the number of unique patterns that can be stored in the pattern table 300 is equal to the number of different values that the index value 304 can take on. For example, where the index value 304 is an eight-bit (i.e., one byte) value, then this seems to mean that the number of different patterns that can be stored in the pattern table 300 is just $2^8=256$. However, the embodiment of FIG. 3 overcomes this limitation, ensuring that the total number of entries and thus the total number of different patterns stored in the pattern table 300 can be greater than the total number of different index values, as is now described.

Once all the different index values have been used, they are reused again in order. In the example of FIG. 3, the index values 0 and 1, for instance, have been reused. When reusing an index value, the end time for the previous entry that most recently used the index value is set equal to the start time for the new entry that is reusing the index value. For example, when adding the entry 302M to the pattern table 300, the start time of $t_b$ for the entry 302M is set as the end time for the entry 302A that has the same index value of zero. Likewise, when adding the entry 302N to the pattern table 300, the start time of $t_c$ for the entry 302N is set as the end time for the entry 302B that has the same index value of one. Thus, each entry within the pattern table 300 has a start time, and where the index value of an entry has been subsequently reused in a later entry, also has an end time equal to the start time of this later entry reusing the same index value.

In this way, the pattern table 300 is actually looked up in part 206 of the method 200 by both the pattern of the histogram generated in part 204, and the time value of the histogram received in part 202. In particular, the entries 302 of the pattern table 300 are searched for to determine if there is an entry that has the same pattern, that has a start time less than or equal to the time value, and that has an end time greater than the time value or that has no end time. It is further noted that due to the manner by which the entries 302 are added to the pattern table 300, searching of the pattern table 300 can be restricted or limited in part 206 to just those entries that have no end times. This is because the end time of any entry that has an end time will necessarily in this embodiment be less than the time value for the histogram received in part 202. Thus, just the entries of the pattern table 300 that have time ranges that do not yet have end times may be searched in part 202 for an entry that has a pattern identical to the pattern generated in part 204.

Referring back to FIG. 2, where a given entry is not located within the pattern table 300 that matches the pattern generated in part 204 and the time value received in part 202, then the method 200 proceeds to add a new entry for the pattern to the pattern table 300 (210). Where the index value of the last entry within the pattern table 300 (i.e., the entry most recently added to the pattern table 300) is equal to the maximum index value, the index value for the new entry is set to the minimum index value (i.e., the index value rolls over). Where the index value of the last entry within the pattern table is less than the maximum index value, then the index value for the new entry is set to the index value of the last entry, plus one.

Furthermore, where the index value of the new entry of the pattern table 300 is already used by an existing entry within the pattern table 300, and where the time range of the existing entry does not have an end time, then the end time of the time range of the existing entry is set to the time value received in part 202. Likewise, the start time of the new entry is set to the time value received in part 202, and the end time of the new entry is not yet set. The pattern of the new entry is set to the pattern generated in part 204.

For example, consider the process by which the entry 302N is added to the pattern table 300, for a given pattern generated in part 204 and for a time value of $t_c$ received in part 202. Prior to adding the entry 302N, the last entry within the pattern table 300 is the entry 302M. Because the entry 302M has an index value 304 of zero, the index value 304 of the new entry 302N is set to one. Because the index value 304 of the entry 302N was previously used in the entry 302B, the end time 308 of the entry 302B is set equal to the time value of $t_c$ (where the entry 302B did not have an end time prior to the adding of the entry 302N). The start time 306 of the new entry 302N is also set to the time value of $t_c$, and the end time 308 of the entry 302N remains unset for the time being. The pattern 312 of the entry 302N is set to the pattern generated in part 204.

It is noted that as a result of this process, there will always be exactly one previous entry for which the end time 308 is set when a new entry is added that reuses an index value. For instance, the first time an index value is reused, there is just one previous entry that uses the same index value, and the end time 308 of the previous entry is set. The second time the index value is reused, there are two previous entries that use the same index value, but just the end time 308 of the previous entry that most recently used the index value is unset and thus is set when adding the new entry. That is, the first entry that initially used the index value already had its end time 308 set when the second entry that used the same index value was added.

Referring back to FIG. 2, the method 200 proceeds to part 212 from either part 208, where the pattern generated in part 204 and the time value received in part 202 match a given entry within the pattern table 300, or from part 210, where a new entry was added to the pattern table 300. It is noted that where a new entry was added to the pattern table 300, it can be said that this new entry is a given entry within the pattern table 300 that the pattern generated in part 204 and the time value received in part 202 now match. That is, part 210 adds a new entry to the pattern table 300 that matches the pattern and the time value in question, where an existing entry within the pattern table 300 did not match the pattern and the time value in question.

Therefore, the method 200 compresses the non-zero values of the histogram into a compressed value (212), as has been described in relation to FIG. 1 above. For instance, Fibonacci encoding, shifted Fibonacci encoding, and/or Elias encoding can be used to compress the non-zero values of the histogram into a compressed value. Thereafter, the method 200 adds an entry for the histogram to a histogram table (214). The histogram table has a number of entries. Each entry of the histogram table has the time value of a histogram, an index value corresponding to the index value of the matching entry in the pattern table 300, and a compressed value of any non-zero values of the ranges of the histogram in question.

FIG. 4 shows a representative histogram table 400, according to an embodiment of the invention. The histogram table 400 includes a number of entries 402A, 402B, 402C, . . . , 402N, collectively referred to as the entries 402. Each of the entries 402 has an index value 404, a time value 406, and a compressed value 408. Each of the entries 402 particularly corresponds to a histogram.

The index value 404 of an entry corresponds to the index value 304 of an entry within the pattern table 300 that has a pattern 312 of the histogram in question. The time value 406 of an entry corresponds to the time value of the histogram in question. The compressed value 408 of an entry corresponds to the compressed value representing any non-zero values of the histogram in question.

Thus, an entry is added to the histogram table 400 in part 214 of the method 200 as follows. The index value 404 of the entry is set to the index value 304 of the matching entry within the pattern table 300. This matching entry of the pattern table 300 is the entry located in part 206, if an entry was so located, or the entry added in part 210, if no entry was located in part 206. The time value 406 of the entry is set to the time value received in part 202. The compressed value 408 of the entry is set to the compressed value generated in part 212.

It is noted that because there can be more than one entry within the pattern table 300 that have the same index value as a given entry within the histogram table 400, the index value is not employed by itself to locate the correct entry within the pattern table 300 that corresponds to a given entry within the histogram table 400. Rather, the index value 404 is used in combination with the time value 406 to locate the correct entry within the pattern table 300 that corresponds to a given entry within the histogram table 400. In particular, the entry within the pattern table 300 that corresponds to a given entry within the histogram table 400 is the entry that has an index value 304 equal to the index value 404 of the given entry within the histogram table 400, and that has a start time 306 less than or equal to the time value 406, and that has an end time 308 greater than the time value 406 or that does not currently have an end time 308.

For example, consider the entry 402A of the histogram table 400. For example purposes it is assumed that the index value 404 of the entry 402A is equal to zero, and that time to is less than time $t_b$. There are two entries within the pattern table 300 that have the same index value of zero: the entry 302A and the entry 302M. However, the entry 302M has a start time 306 of $t_b$ that is greater than the time value 406 of to of the entry 402A. By comparison, the entry 302A has a start time 306 of to that is less than or equal to the time value 406 of to of the entry 402A, and has an end time 308 of $t_b$ that is greater than the time value 40 of to of the entry 402A. Therefore, the pattern 312 of the entry 302A—and not the pattern 312 of the entry 302M—is the pattern of the histogram of the entry 402A.

Figure 5:
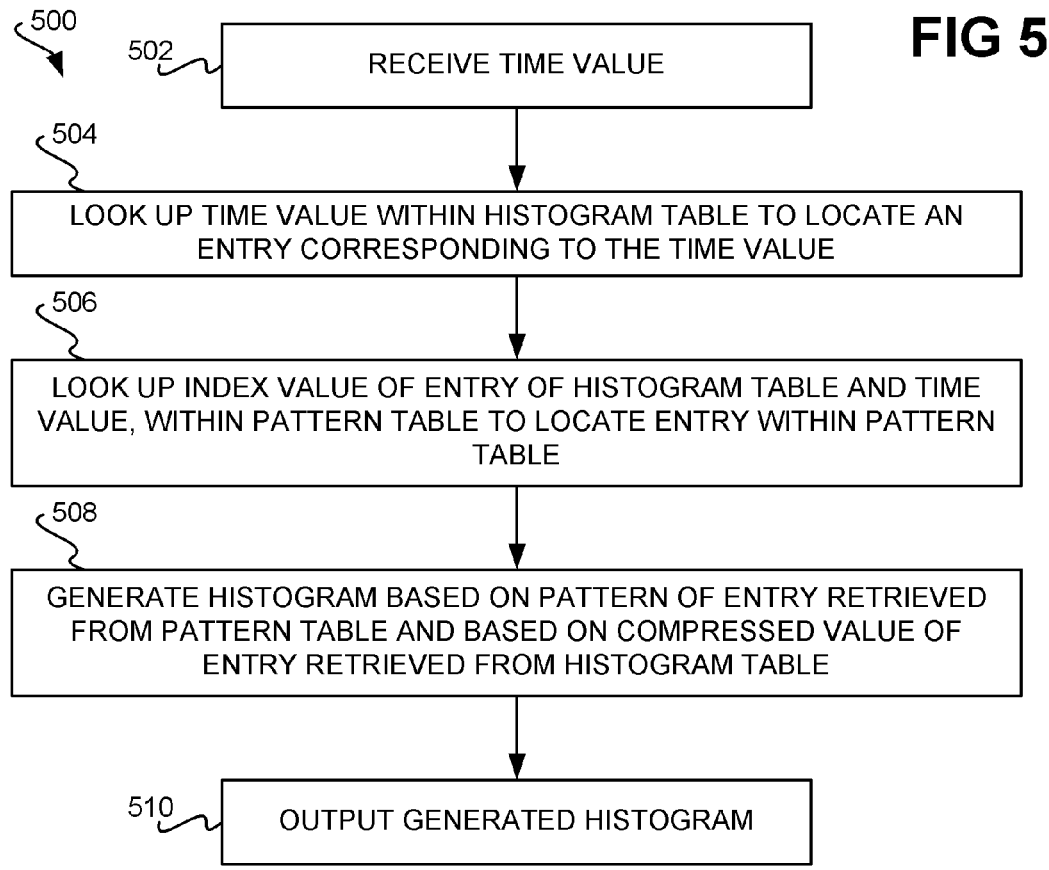
FIG. 5 is a flowchart of a method for generating a histogram from data stored in a histogram table and in a pattern table, according to an embodiment of the invention.

FIG. 5 shows a method 500 for generating a histogram corresponding to a time value at which time the histogram was previously created, according to an embodiment of the invention. The method 500 may be implemented as one or more computer programs that are stored on a tangible computer-readable medium, such as a recordable data storage medium, and that are executed by a computing device. The method 500 receives the time value (502). The time value corresponds to the time period in which the histogram to be generated had previously been created. For instance, this time value may correspond to the start time of the time period in which the histogram in question recorded data points.

The time value is looked up within the histogram table 400 to locate an entry that corresponds to the time value (504). Because histograms are sequentially created, there is at most one such entry within the histogram table 400. The entry includes an index value 404, a time value 406 that matches the time value received in part 502, and a compressed value 408.

The index value 404 of the entry retrieved from the histogram table 400, as well as the time value received in part 502, are looked up within the pattern table 300 to locate an entry that corresponds to the index value 404 and this time value (506). As has been described, there is at most one such entry within the pattern table 300. This is the entry within the pattern table 300 that has a time range having a start time 306 that is less than or equal to the time value and an end time that is not present, or the entry that has a time range having a start time 306 that is less than or equal to the time value and an end time that is greater than the time value. This entry includes an index value 304 that matches the index value 404 of the entry retrieved in part 504, a time range that matches the time value received in part 502, and a pattern 312.

The histogram is then generated based on the pattern 312 of the entry retrieved from the pattern table 300 in part 506 and based on the compressed value 408 of the entry retrieved from the histogram table 400 in part 504 (508). In particular, the values of the pattern 312 are proceeded through in order from the first value of the pattern 312 to the last value of the pattern 312. Where a given value of the pattern 312 is zero, a zero value is generated for the corresponding range of the histogram. Where a given value of the pattern 312 is one, the next non-zero value is decompressed from the compressed value 408, as has been described. In this way, the histogram is generated. The generated histogram may then be output (510), such as by displaying the histogram, storing it in a storage device, printing the histogram, using the histogram for further processing, and so on, as can be appreciated by those of ordinary skill within the art.

Figure 6:
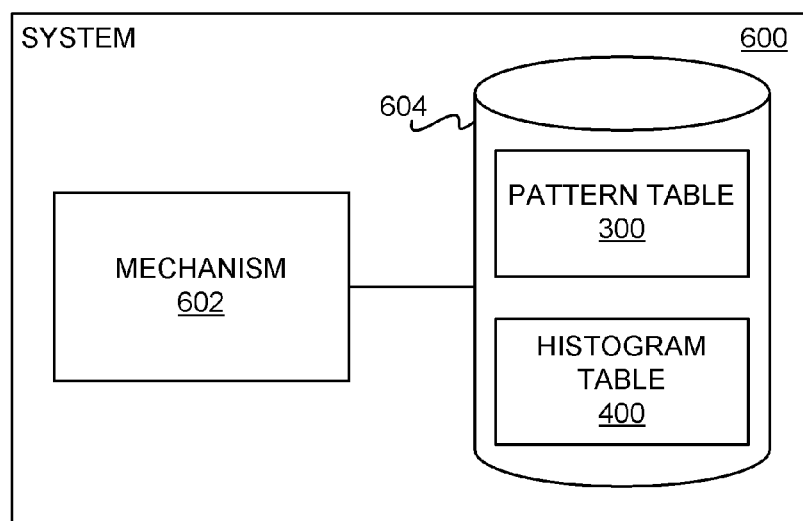
FIG. 6 is a diagram of a rudimentary system, according to an embodiment of the invention.

FIG. 6 shows a rudimentary system 600, according to an embodiment of the invention. The system 600 includes a mechanism 602 and one or more databases 604. As can be appreciated by those of ordinary skill within the art, the system 600 can and typically will include other components, in addition to those depicted in FIG. 6. Such components can include hardware components like memory, processors, storage devices, and so on, as well as software components like operating systems, application programs, and so on.

The mechanism 602 may be implemented in software, hardware, or a combination of software and hardware. The databases 604 may be structured query language (SQL) databases, or other types of databases. The databases 604 store the pattern table 300 and the histogram table 400, as database tables, as can be appreciated by those of ordinary skill within the art. It is noted that in at least some embodiments, the pattern table 300 is a different and separate database table than the histogram table 400 is. The mechanism 602 updates the tables 300 and 400 upon receiving new histograms to be stored within the databases 604, such as by performing the method 200 of FIG. 2 that has been described. Likewise, the mechanism 602 retrieves existing histograms stored within the databases 604, by querying the tables 300 and 400 upon receiving time values corresponding to the existing histograms, such as by performing the method 500 of FIG. 5 that has been described.

In the embodiments of the invention that have been described, histograms are stored in an efficient manner by storing their patterns within a pattern table separately from their non-zero values within a histogram table. For such efficiencies to be realized, it is noted that in the vast majority of especially sparse histograms, the amount of storage space needed to store the histogram in uncompressed form is greater than the amount of storage space needed to store the non-zero values of the histogram in compressed form. However, in certain situations, the amount of space needed to store the histogram in uncompressed form can be less than the amount of space needed to store the non-zero values of the histogram in compressed form. Therefore, what follows is a description of modifications that can be made to the methods 200 and 500 of FIGS. 2 and 5, respectively to accommodate this degenerate case.

Figure 7:
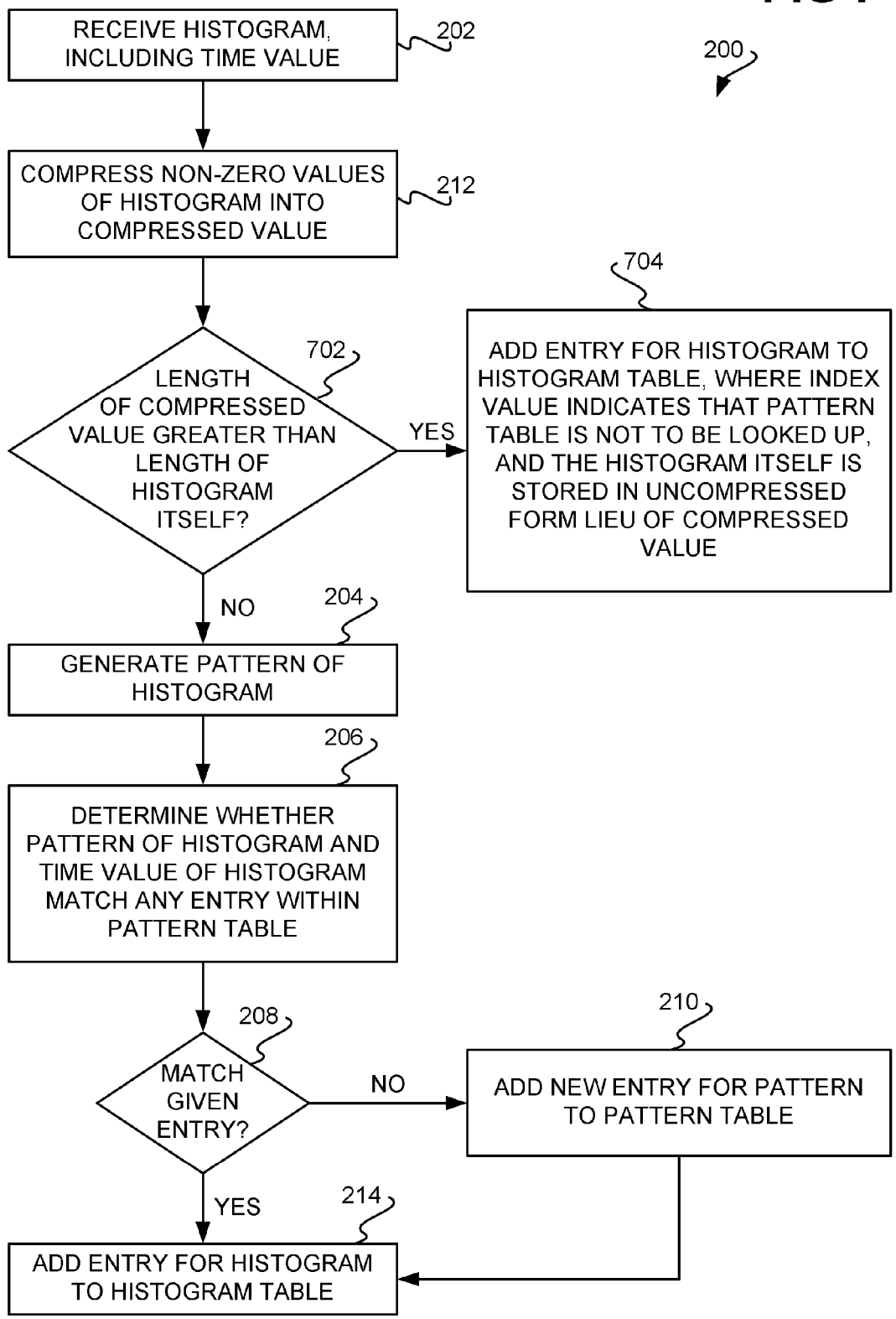
FIG. 7 is a flowchart of a method similar to that of FIG. 2, but in which a degenerate case is handled, according to an embodiment of the invention.

FIG. 7 shows the method 200 of FIG. 2, according to an embodiment of the invention in which the degenerate case is accommodated. As before, a histogram and a time value are received (202). The non-zero values of the histogram are compressed into a compressed value (212), as has been described. If the length of the compressed value is not greater than the length of the histogram itself (702), then this means that the regular, non-degenerate case is present, such that the method 200 proceeds to perform parts 204, 206, 208, and/or 214, as has been described in relation to FIG. 2, in the order indicated in FIG. 7.

However, where the length of the compressed value is greater than the length of the histogram itself (702), this means that the degenerate case is present, where more storage space is required to store the compressed value than is required to store the histogram itself. Therefore, an entry is added for the histogram to the histogram table 400 (704). In this entry, the index value 404 is set to a special, reserved value that indicates that the compressed value field 408 does not actually store the compressed value of the non-zero values of the histogram, but rather stores the actual histogram itself. For instance, the index value 404 may be set to zero, where such an index value of zero is removed from the allowable values to which the index value 304 within the pattern table 300 may be set. The time value 406 is set to the time value received in part 202, as in the non-degenerate case.

Figure 8:
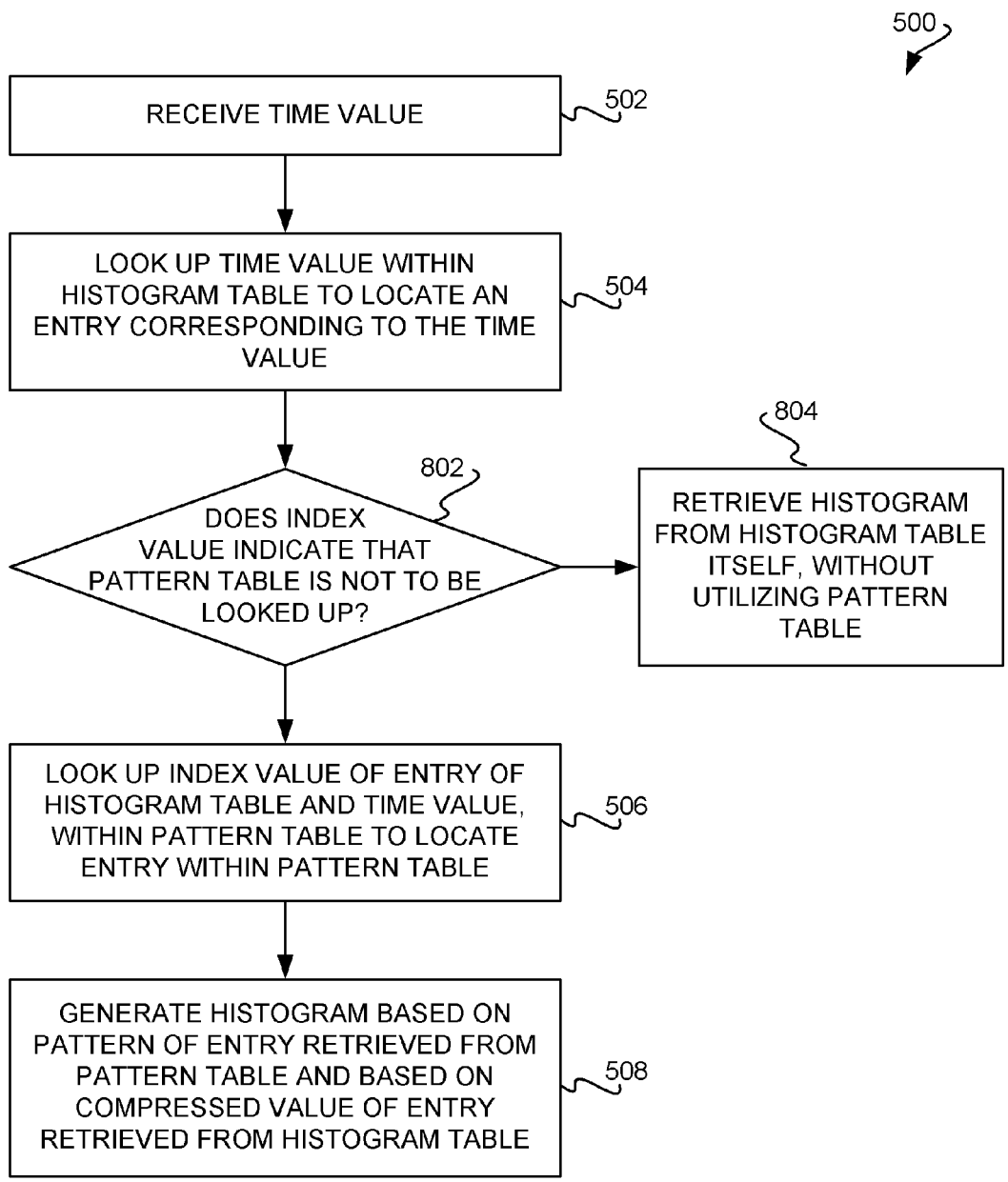
FIG. 8 is a flowchart of a method similar to that of FIG. 5, but in which a degenerate case is handled, according to an embodiment of the invention.

Next, FIG. 8 shows the method 500 of FIG. 5, according to an embodiment of the invention in which the degenerate case is accommodated. As before, a time value is received (502), and is looked up within the histogram table 400 to locate an entry corresponding to the item value (504). If the index value of this entry indicates that the pattern table 300 is to be looked up to identify the pattern of the histogram to be generated (802)—i.e., if the index value is not set to the special, reserved value—then the method 500 proceeds to perform parts 506 and 508 as has been described in relation to FIG. 5, in the order indicated in FIG. 8.

However, where the index value of this entry indicates that the pattern table 300 is not to be looked up to identify the pattern of the histogram to be generated (802)—i.e., if the index value is set to the special, reserved value—this means that the degenerate case is present. Therefore, the histogram is retrieved from the histogram table 400 itself (804), without utilizing the pattern table. The histogram is directly retrieved in this case from the compressed value field 408 in which it was previously stored.

Thus, in the degenerate case where the histogram is smaller in length than the compressed value representing the non-zero values of the histogram is, the compressed value field is used to store the histogram itself in lieu of compressed value. The compressed value is thus not stored in the degenerate case. The index value is set to a special, reserved value to indicate that the compressed value field has been used to store the histogram instead of a compressed value. As such, generating the histogram does not involve looking up a pattern within the pattern table 300, since the entire histogram is stored in the histogram table 400, as opposed to just a compressed value representing the non-zero values being stored in the histogram table 400.

At least some embodiments of the invention have been described in relation to histograms that correspond to a computing device. The ranges of such a histogram correspond to utilized or consumed power ranges of the computing devices, where the value of the histogram for each range corresponds to the number of times the computing device in question was sampled during a specific time period as utilizing an amount of power within the corresponding utilized power range. The time value of the histogram in this embodiment corresponds to the specific time period during which the computing device had its power consumption or utilization sampled.

Those of ordinary skill within the art, however, can appreciate that this embodiment of the invention can be extended so that the power consumption histograms of more than one computing device are recorded. For instance, a column may be added to each of the database tables 300 and 400 that indicates the identity of a particular computing device. In this way, the tables 300 and 400 can record the power consumption or utilization histograms for any number of computing devices.

Likewise, those of ordinary skill within the art can appreciate that other embodiments of the invention can be implemented in which the histograms in question relate to physical members, elements, quantities, characteristics, attributes, and so on, other than computing devices and the power consumed or utilized by such computing devices. It is thus noted that this application is intended to cover any adaptations or variations of the embodiments described herein. Although specific embodiments have been illustrated and described herein, those of ordinary skill in the art can further appreciate that any arrangement calculated to achieve the same purpose may be substituted for the specific embodiments shown. Therefore, it is manifestly intended that this invention be limited only by the claims listed below and equivalents thereof.

I claim:

1. A method comprising:
receiving a histogram, the histogram having a plurality of ranges, the histogram having a value for each range, the histogram having a time value;
generating a pattern of the histogram that compresses the histogram in a lossy manner, the pattern having a zero value for each range having a zero value, the pattern having a one value for each range having a non-zero value;
determining whether the pattern of the histogram and the time value of the histogram match any given entry of a pattern table without comparing the histogram itself to the pattern table, the pattern table having a plurality of entries, each entry having an index value, a time range, and a pattern;
where the pattern of the histogram and the time value of the histogram match a given entry of the pattern table, the given entry now corresponding to at least two histograms, including the histogram and one or more other histograms;
where the pattern of the histogram and the time value of the histogram do not match any given entry of the pattern table, adding a new entry to the pattern table, the time range of the new entry having a start time equal to the time value of the histogram, the pattern of the new entry equal to the pattern of the histogram, the new entry being the given entry that the pattern of the histogram and the time value of the histogram now match;
compressing any non-zero values of the ranges of the histogram into a compressed value; and,
adding an entry for the histogram to a histogram table different than the pattern table, the entry having the time value of the histogram, the index value of the given entry of the pattern table, and the compressed value of any non-zero values of the ranges of the histogram, the entry added for the histogram to the histogram table corresponding to just the histogram and to no other histogram,
such that the histogram is compressed in a lossless manner via the given entry of the pattern table and the entry of the histogram table.

2. The method of claim 1, wherein the histogram is a sparse histogram.

3. The method of claim 1, wherein the pattern table is a first database table, and the histogram table is a second database table, the first database table being a different database table than the second database table is.

4. The method of claim 1, wherein the non-zero value of at least one range is greater than one.

5. The method of claim 1, wherein each zero value of the pattern of the histogram is a zero bit, and each one value of the pattern of the histogram is a one bit.

6. The method of claim 1, wherein compressing any non-zero values of the ranges of the histogram into the compressed value comprises using one or more of: Fibonacci encoding, shifted Fibonacci encoding, and Elias encoding.

7. The method of claim 1, wherein the histogram is a first histogram, the method further comprising for a second histogram, the second histogram having a plurality of ranges, the second histogram having a value for each range, the second histogram having a time value:
compressing any non-zero values of the ranges of the second histogram into a compressed value;
determining whether a length of the compressed value of any non-zero values of the ranges of the second histogram is greater than a length of the second histogram itself; and, where the length of the compressed value of any non-zero values of the ranges of the second histogram is greater than a length of the second histogram itself,
adding an entry for the second histogram to the histogram table, the entry having the time value of the histogram value, an index value indicating that the pattern table is not to be looked up to locate a pattern of the second histogram, and the second histogram itself, where the second histogram itself is stored within the entry in lieu of storing the compressed value of any non-zero values of the ranges of the second histogram within the entry.

8. The method of claim 1, wherein the histogram corresponds to a computing device, the ranges of the histogram corresponding to utilized power ranges of the computing device, the value of the histogram for each range corresponding to a number of times the computing device was sampled during a specific time period as utilizing an amount of power within a utilized power range corresponding to the range, the time value of the histogram corresponding to the specific time period within which the computing device was sampled.

9. A non-transitory computer-readable medium having one or more computer programs stored thereon to perform a method comprising, for a histogram:
receiving at least a time value;
looking up the time value within a histogram table to locate an entry within the histogram table corresponding to the time value, the entry having the time value, an index value corresponding to an entry within a pattern table, and a compressed value of any non-zero values of a plurality of ranges of the histogram;
looking up the index value and the time value within the pattern table different than the histogram table to locate an entry within the pattern table corresponding to the index value and the time value, the entry within the pattern table having the index value, a time range encompassing the time value, and a pattern, the pattern having a zero value for each range of the histogram having a zero value, the pattern having a one value for each range of the histogram having a non-zero value; and,
generating the histogram based on the pattern retrieved from the pattern table and based on the compressed value retrieved from the histogram table, the pattern compressing histogram in a lossy manner,
such that the histogram is compressed in a lossless manner via the entry within the histogram table and the entry within the pattern table,
wherein a particular entry within the pattern table corresponds to at least two histograms, and each entry within the histogram table corresponds to just one histogram.

10. The computer-readable medium of claim 9, wherein the method further comprises outputting the histogram.

11. The computer-readable medium of claim 9, wherein the time range of the entry within the pattern table encompasses the time value where one of:
the entry within the pattern table is an only entry within the pattern table with a time range having a start time that is less than or equal to the time value and an end time that is not present; and,
the entry within the pattern table is an only entry within the pattern table with a time range having a start time that is less than or equal to the time value and an end time that is greater than the time value.

12. The computer-readable medium of claim 9, wherein generating the histogram based on the pattern retrieved from the pattern table and based on the compressed value retrieved from the histogram table comprises:
for each value of a plurality of values of the pattern retrieved from the pattern table, proceeding in order from a first value of the pattern to a last value of the pattern,
where the value is equal to zero, generating a corresponding zero value for the histogram; and,
where the value is equal to one, decompressing a next non-zero value from the compressed value retrieved from the histogram table, as a corresponding non-zero value for the histogram.

13. The computer-readable medium of claim 9, wherein the histogram is a first histogram, the time value is a first time value, and the method further comprises, for a second histogram:
receiving at least a second time value;
looking up the second time value within the histogram table to locate an entry within the histogram table corresponding to the second time value, the entry having the time value, an index value, and a third value;
where the index value indicates that the pattern table is not to be looked up to locate a pattern for the second histogram,
setting the second histogram equal to the third value, where the third value would normally and otherwise be a compressed value of any non-zero values of a plurality of ranges of the second histogram, but the third value is instead the second histogram itself.

14. The computer-readable medium of claim 9, wherein the histogram corresponds to a computing device, the ranges of the histogram corresponding to utilized power ranges of the computing device, the value of the histogram for each range corresponding to a number of times the computing device was sampled during a specific time period as utilizing an amount of power within a utilized power range corresponding to the range, the time value of the histogram corresponding to the specific time period within which the computing device was sampled.

15. A computerized system comprising:
hardware including a processor;
one or more storage devices storing one or more databases;
a pattern database table stored within the databases, the pattern database table having a plurality of entries, each entry having an index value, a time range, and a pattern, the pattern or each entry compressing one or more histograms in a lossy manner, a particular entry corresponding to more than one histogram;
a histogram database table stored within the databases, the histogram database table different than the pattern database table, the histogram database table having a plurality of entries, each entry corresponding to a single histogram, each entry having a time value corresponding to the time range of an entry within the pattern database table, an index value corresponding to the index value of an entry within the pattern database table, and a compressed value of any non-zero values of the ranges of the histogram to which the entry corresponds; and,
a mechanism implemented by the hardware to update the pattern database table and the histogram database table upon receiving new histograms to be stored within the databases, and to retrieve existing histograms stored within the databases by querying the pattern database table and the histogram database table upon receiving time values corresponding to the existing histograms, wherein a total number of entries stored in the pattern database table is greater than a total number of different index values, such that each of one or more histograms is compressed in a lossless manner via one of the entries of the pattern database table and via one of the entries of the histogram database table.

16. The computerized system of claim 15, wherein the histogram corresponds to a computing device, the ranges of the histogram corresponding to utilized power ranges of the computing device, the value of the histogram for each range corresponding to a number of times the computing device was sampled during a specific time period as utilizing an amount of power within a utilized power range corresponding to the range, the time value of the histogram corresponding to the specific time period within which the computing device was sampled.

* * * * *